| United States Patent [19] | [11] Patent Number: 4,975,063 |
| Ida et al. | [45] Date of Patent: Dec. 4, 1990 |

[54] FLAT CABLE FOR STEERING

[75] Inventors: Yuichi Ida; Hironori Kato, both of Miyagi, Japan

[73] Assignee: Alps Electric Co., Ltd., Tokyo, Japan

[21] Appl. No.: 427,261

[22] Filed: Oct. 25, 1989

[30] Foreign Application Priority Data

Dec. 22, 1988 [JP] Japan .......................... 63-165114[U]

[51] Int. Cl.$^5$ ........................................... H01R 35/00
[52] U.S. Cl. ....................................... 439/15; 439/164
[58] Field of Search ........................... 439/13, 15, 164

[56] References Cited

U.S. PATENT DOCUMENTS 3,426,308  2/1969  Andersen et al. .
4,696,523  9/1987  Schauer et al. ................... 439/15 X
4,744,763  5/1988  Suzuki et al. .

Primary Examiner—Eugene F. Desmond
Attorney, Agent, or Firm—Guy W. Shoup; Paul J. Winters

[57] ABSTRACT

A clock spring interconnector for electrically connecting a fixed member and a movable member by use of a flexible cable such as a flat cable. The clock spring interconnector comprises a fixed member, a movable member mounted rotatably with respect to the fixed member, and a flexible cable received inplural turns between an inner ring wall provided on either the fixed member or the movable member and an outer ring wall provided on the other, both ends of the flexible cable in the winding direction being secured to the inner ring wall and the outer ring wall, respectively. An inversion preventing tongue is provided along the inner surface of the flexible cable extending from the inner ring wall, the tongue being secured to at least one of the inner ring wall and the flexible cable, and a recess capable of receiving the tongue is provided in a part of the peripheral surface of the inner ring wall.

4 Claims, 5 Drawing Sheets

FLAT CABLE FOR STEERING

BACKGROUND OF THE INVENTION

1. Field of the Invention

The present invention relates to a clock spring interconnector for electrically connecting a fixed member and a movable member by use of flexible cable such as a flat cable, and more particularly to a clock spring interconnector suitable for use with a steering system for a vehicle.

2. Description of the Prior Art

In a clock spring one end of a flexible cable such as a flat cable is secured to a fixed member whereas the other end thereof is secured to a movable member so that when the movable member is rotated, the flexible cable is wound on or unwound from the movable member to thereby rotate the movable member through a predetermined amount. The clock spring interconnector is used for a steering system for a vehicle or the like.

FIGS. 4 to 6 show a conventional clock spring interconnector for an automobile of this kind. FIG. 4 is an exploded perspective view, FIG. 5 is a longitudinal sectional view and FIG. 6 is a plan view with a part of the movable member omitted. In these figures, reference numeral 1 designates a movable member. The movable member 1 has in its central portion a rotational tube 3 suspended having an axial inserting hole 2, and a cylindrical holder 4 is arranged externally of the rotational tube 3. The holder 4 has a vertically extending slit 4a and a recess 4b in an inner surface thereof, the holder 4 being fixedly mounted on a top place of the movable member 1 in a relation spaced apart from the outer peripheral surface of the rotational tube 3.

Reference numeral 5 designates a flat cable in which a plurality of conductors formed of copper foil or the like are laminated by two base films having a flexibility such as polyethylene terephthalate (PET). One end of the flat cable 5 reaches the recess 4b passing through the slit 4b of the holder 4 and thereafter is turned back at right angles through a folding line approximately at 45 degrees within the recess 4b and finally extended outside the movable member 1. At the aforesaid turned-back portion, the flat cable 5 is divided into two extended-out portions 5a and 5b along the lengthwise, the extended-out portions 5a and 5b each being folded back at positions superposed with each other. These portions 5a and 5b are snap-coupled to each other and held and fixed between first and second stoppers 6 and 7 secured to the top plate of the movable member 1. In this state, a taper portion 6a formed in the first stopper 6 is inserted into the turned-back portion of both the extended-out portions 5a and 5a.

Reference numeral 8 designates a fixed member. The fixed member 8 is formed in the central portion thereof with a center hole 9 in which a rotary tube 3 of the movable member 1 is rotatably snapped in, and the fixed member 8 is further formed in the outer peripheral portion thereof with an outer ring wall 10 for receiving therein the flat cable 5. The outer ring wall 10 is formed with a projecting guide portion 11 directed obliquely and downwardly. The other end of the flat cable 5 is turned back at right angles internally of the outer ring wall 10 and thereafter extended externally of the fixed member 8 along the guide portion 11. A positioning mechanism 13 provided with a gear 12 is provided on the outer ring wall 10, the gear 12 being engaged with an engaging projection 14 provided on the outer periphery of the movable 1 so that the gear 12 is rotated through a predetermined angle.

The clock spring interconnector is roughly formed as described above and used, in various equipment, for example, with the movable member 1 mounted on the side of the steering wheel of the steering system and with the fixed member 8 mounted on the side of the bearing of the steering shaft. In this case, when the steering wheel (movable member 1) is rotated toward one side, the flat cable 5 is wound toward the holder (inner ring wall) whereas when the steering wheel is rotated toward the other side, the flat cable 5 is wound toward the outer ring wall 10. In either state, the electric connection between the movable member 1 and the fixed member 8 is maintained through the flat cable 5. Since the gear 12 comes into contact with the engaging projection 14 and is rotated through a predetermined angle as the movable member 1 rotates for once, marks can be marked on a specific tooth of the gear 12 and a case side of a positioning mechanism, for example, to prevent an occurrence of a difference in rotational amount between the normal and reverse directions of the flat cable 5 to prevent a breakage or buckling of the flat cable 5.

However, even if the positioning mechanism 13 is provided between the movable member 1 and the fixed member 8, as mentioned above, it is difficult to completely eliminate an erroneous mounting. For example, the movable member 1 is sometimes mounted in a state where the movable member 1 is rotated in either one direction from a neutral position. In the case where erroneous mounting is made so that the rotational amount of the movable member in the unwinding direction of the flat cable 5 is lessened, when the movable member 1 is rotated in that direction in an amount in excess of a predetermined amount, a portion in the vicinity of the inner peripheral end of the flat cable 5 is inverted and bended, as shown in FIGS. 7(a), 7(b) and 7(c), resulting causes of lowering a reliability of connection such as a breakage of conductor, peeling of film, etc.

A clock spring interconnector has been proposed as disclosed in Japanese Utility Model Application Laid-Open Publication No. 168581/1987, in which an elastic tongue formed from a resin sheet or the like is provided along the flat cable to prevent the flat cable from being inverted. This proposal, however, poses a problem in that since the winding diameter of the flat cable to the inner ring wall substantially increases due to the thickness of the elastic tongue, the limited rotational frequency of the movable member is smaller than the case of using no elastic tongue.

SUMMARY OF THE INVENTION

The present invention has been accomplished in view of the prior art as described above. It is an object of the present invention to provide a clock spring interconnector which can positively prevent inversion and buckling of a flexible cable without reducing the limited rotational frequency of the movable member.

For achieving the aforesaid object, the present invention provides a clock spring interconnector comprising a fixed member, a movable member mounted rotatably with respect to said fixed member, and a flexible cable received in plural turns between an inner ring wall provided on either the fixed member or the movable member and an outer ring wall provided on the other, both ends of said flexible cable in the winding direction being secured to said inner ring wall and said outer ring wall, respectively, and led out, characterized in that an inversion preventing tongue is provided along the inner surface of the flexible cable extending from said inner ring wall, said tongue being secured to at least one of the inner ring wall and the flexible cable, and a recess capable of receiving said tongue is provided in a part of the peripheral surface of the inner ring wall.

In the case where the movable member is rotated in the direction in which the flexible cable is wound in the inner ring wall, the tongue is received into the recess by the winding force of the flexible cable and the flexible cable is wound in a continuous peripheral surface formed by the tongue and the other portion of the inner ring wall. Therefore, the limited rotational frequency of the movable member is not reduced. On the other hand, when the movable member is rotated in the direction in which the flexible cable is unwound from the inner ring wall to the outer ring wall to exert the inverting force on the portion in the vicinity of the inner peripheral end of the flexible cable, for example, due to the erroneous mounting, the rigidity of that portion is increased and therefore the inversion and buckling of the flexible cable is prevented.

BRIEF DESCRIPTION OF THE DRAWINGS

FIGS. 4 to 7 show prior arts;

FIG. 4 is an exploded perspective view of a cable reel;

FIG. 5 is a longitudinal sectional view thereof;

FIG. 6 is a plan view thereof; and

DESCRIPTION OF THE PREFERRED EMBODIMENTS

Embodiment of the present invention will be described with reference to the accompanying drawings.

Figure 1:
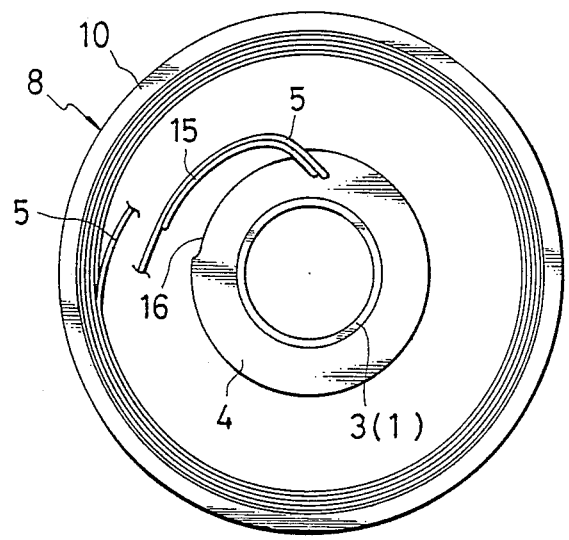
FIG. 1 is a plan view showing a schematic construction of a clock spring interconnector according to one embodiment of the present invention.
Figure 4:
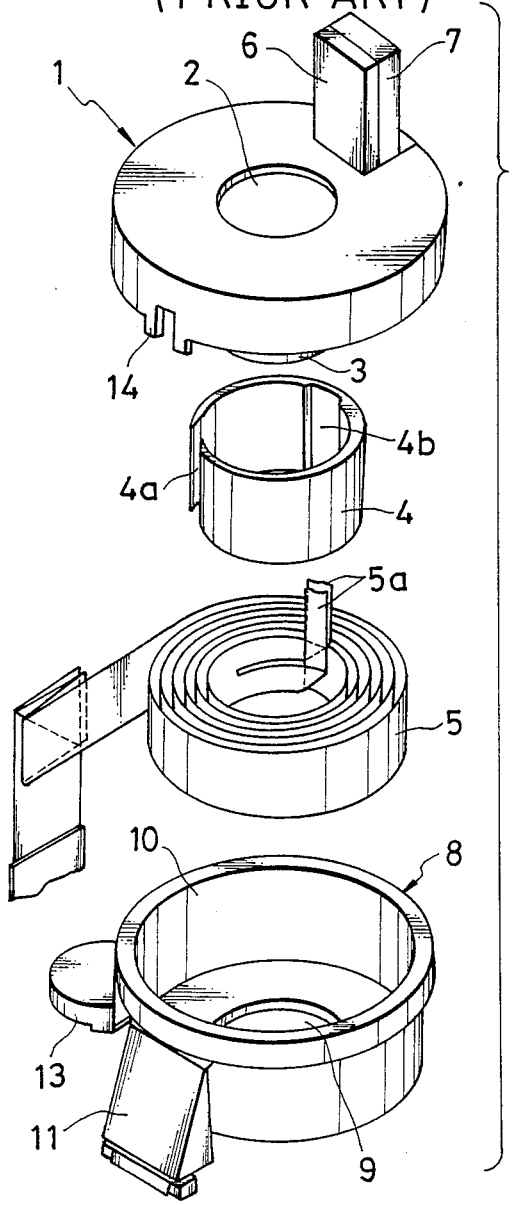
Figure 5:
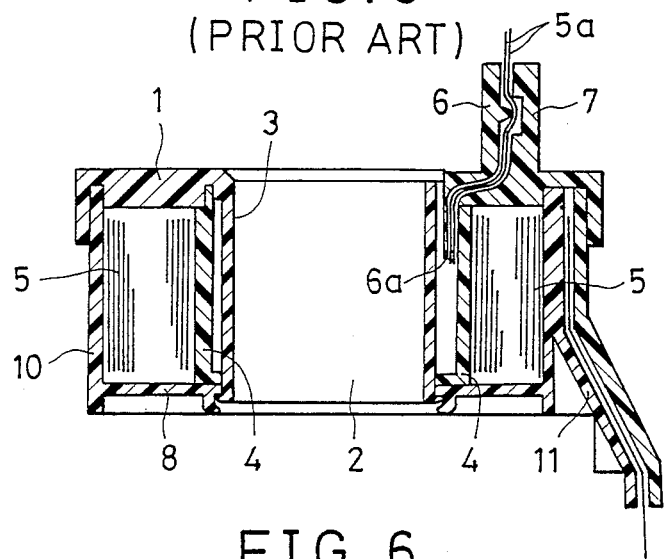
Figure 6:
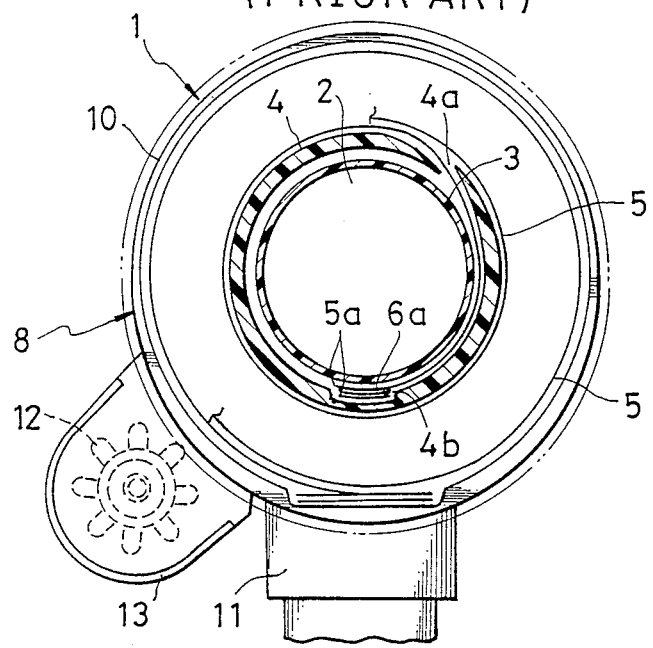
Figure 7A:
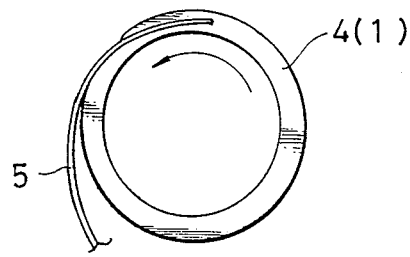
FIGS. 7(a), 7(b) and 7(c) are respectively explanatory view of inversion operation of a flat cable.
Figure 7B:
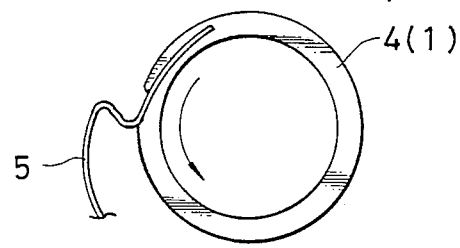
Figure 7C:
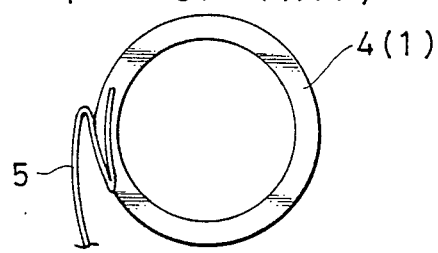

FIG. 1 is a plan view showing a schematic construction of a clock spring interconnector according to the first embodiment of the present invention. The present embodiment is different from the conventional example shown in FIGS. 4 to 6 in that an inversion preventing tongue 15 which will be described later is mounted on an inner ring wall (holder 4) of a movable member 1 and that a recess 16 is formed in a part of the peripheral surface of the inner ring wall. The remaining construction is basically similar to the prior art. Parts of the present embodiment corresponding to those of prior art are indicated by the same reference numerals.

The movable member 1 has its rotational tube 3 rotatably supported on the fixed member 8, and a flat cable 5 is received in plural turns between the holder 4 secured to the movable member 1 and the outer ring wall 10 of the fixed member 8. The outer peripheral end of the flat cable 5 is secured to the outer ring wall 10 though not illustrated and led out of the fixed member 8, whereas the inner peripheral end of the flat cable 5 is secured to the holder 4 and led out of the movable member 1. Adhered to the inner surface side of the flat cable 5 extending from the holder 4 is an inversion preventing tongue 15 having a suitable elasticity formed from a resin film or the like, the tongue 15 having one end secured to the holder 4. The holder 4 is formed in a part of the peripheral surface thereof with a recess 16 having a depth having about the same extent as a thickness of the tongue 15 so that when the flat cable 5 is wound into the holder 4, the tongue 15 is received into the recess 16.

When the clock spring interconnector constructed as mentioned above is mounted on the steering system of the automobile and the movable member 1 is rotated by the steering wheel toward one side, for example, in the direction in which the flat cable 5 is wound in the holder 4 (in the direction as indicated by the arrow A), the flat cable 5 is wound along the peripheral surface of the holder 4 together with the tongue 15 adhered to the inner surface side thereof. In this case, the tongue 15 is wound within the recess 16 and the flat cable 5 is wound on the cylindrical surface formed by the tongue 14 and the holder 4 other than the recess 16. Therefore, the limited rotational frequency of the movable member 1 is not reduced by the tongue 15.

Figure 2A:
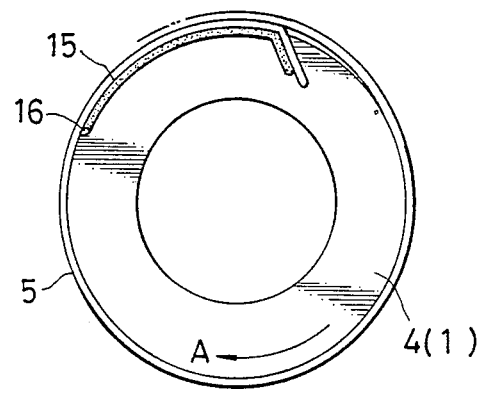
FIG. 2(a) and 2(b) are respectively explanatory views of the operation of a tongue provided on the clock spring interconnector.
Figure 2B:
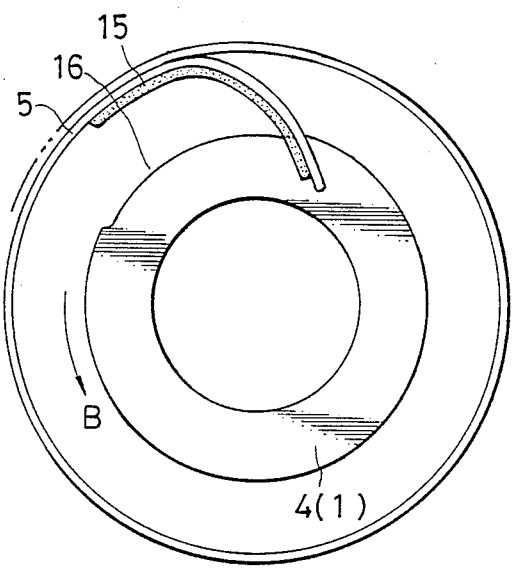

On the other hand, when erroneous mounting is done so that the rotational amount of the movable member 1 in the direction of unwinding the flat cable 5 (in the direction as indicated by the arrow B) and the movable member 1 is rotated in that direction in an amount in excess of a predetermined amount, the tongue 15 is unwound on the outer ring wall side together with the flat cable 5, as shown in FIG. 2, and the rigidity of the portion in the vicinity of the inner peripheral end of the flat cable 5 is enhanced. Therefore, the inversion and buckling of the flat cable 5 in that portion are prevented.

Figure 3:
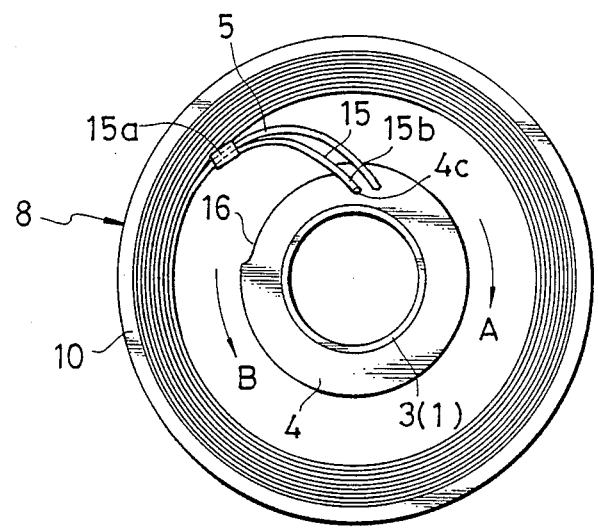
FIG. 3 is a plan view showing another embodiment of a clock spring interconnector according to the present invention.

FIG. 3 is a plan view showing a schematic construction of a clock spring interconnector according to the second embodiment of the present invention. The present embodiment is different from the aforementioned first embodiment in that one end 15a of the tongue 15 is secured to the flat cable 5 while the other end 15b thereof is inserted into and held in an engaging hole 4c provided in the holder 4. In case of the present invention, when the movable member 1 is rotated in the direction as indicated by the arrow A in FIG. 3, the flat cable 5 is wound on the cylindrical surface formed by the tongue 15 positioned within the recess 16 and the holder 4 other than the recess 16. In this case, the free end 15b of the tongue 15 is moved within the engaging hole 4c but the engagement therebetween is not released. On the other hand, when the movable member 1 is rotated in the direction as indicated by the arrow B in FIG. 3 in an amount in excess of a predetermined amount, the tongue 15 is unwound on the outer ring wall side together with the flat cable and comes into contact with the flat cable 5 unwound on the outer ring wall 10. Therefore, the inversion and buckling of the portion in the vicinity of the inner peripheral end of the flat cable 5 are prevented by the tongue 15.

As described above, in the clock spring interconnector according to the present invention, the inversion preventing tongue is wound into the recess formed in the part of the peripheral surface of the inner ring wall by the winding force of the flexible cable. Therefore, the inversion and buckling of the flexible cable can be positively prevented without reducing the limited rotational frequency of the movable member.

What is claimed is:

1. A clock spring interconnector comprising:
   a fixed member having a first ring wall, a movable member having a second ring wall and mounted rotatably with respect to said fixed member,
   a flexible cable received in plural turns between said first ring wall and said second ring wall, said flexible cable having two ends and two surfaces, each end being secured to one of said first ring wall and said second ring wall,
   a resilient inversion preventing tongue provided along one surface of said flexible cable and extending from said first ring wall, said tongue being secured to at least one of said first ring wall and said flexible cable,
   and a recess capable of receiving said tongue provided on the surface of said first ring wall.

2. A clock spring interconnector according to claim 1 wherein said resilient tongue has two ends, one end being secured to said flat cable, and the other end being secured in an engaging hole provided in said first ring wall.

3. A clockspring interconnector comprising:
   a circular inner wall,
   a circular outer wall,
   a flat cable received between said circular inner wall and said circular outer wall, said flat cable having two sides,
   an elastic cable inversion preventing tongue formed from a resin adhered to one side of said flat cable and extending from said circular inner wall, said tongue having two ends, one end being secured to said circular inner wall,
   and a recess having a depth about the same extend as the thickness of said tongue formed in said circular inner wall such that when said flat cable is wound into said circular inner wall, said tongue is received into said recess.

4. A clockspring interconnector according to claim 3 wherein said tongue has one end secured to said flat cable and the other end secured in an engaging hole provided in said circular inner wall.

* * * * *

UNITED STATES PATENT AND TRADEMARK OFFICE
CERTIFICATE OF CORRECTION

PATENT NO.   : 4,975,063
DATED        : December 4, 1990
INVENTOR(S)  : Yuichi Ida et al.

It is certified that error appears in the above-identified patent and that said Letters Patent is hereby corrected as shown below:

Col. 6 line 14, "extend" should read --extent--

Signed and Sealed this

Twenty-third Day of June, 1992

Attest:

DOUGLAS B. COMER

*Attesting Officer*         *Acting Commissioner of Patents and Trademarks*